United States Patent
Sato (10) Patent No.: US 7,375,836 B1
(45) Date of Patent: May 20, 2008

(54) COPIER WITH JOB SHARING AND FORWARDING CAPABILITY

(75) Inventor: Tomotoshi Sato, San Jose, CA (US)

(73) Assignee: Ricoh Comapny, Ltd., Tokyo (JP)

( * ) Notice: Subject to any disclaimer, the term of this patent is extended or adjusted under 35 U.S.C. 154(b) by 250 days.

(21) Appl. No.: 10/280,207

(22) Filed: Oct. 24, 2002

(51) Int. Cl.
G06K 1/00 (2006.01)
G06F 15/00 (2006.01)

(52) U.S. Cl. .......... 358/1.15; 358/1.14; 358/1.16; 358/1.17; 358/1.18; 358/1.13; 358/1.9; 709/201; 709/209; 399/81; 399/82

(58) Field of Classification Search ........... 358/1.12, 358/1.13, 1.14, 1.15, 1.18, 468, 1, 18, 401, 358/407, 296, 1.9; 399/8, 9, 82, 16, 75, 81, 399/361, 362; 709/201, 209
See application file for complete search history.

(56) References Cited

U.S. PATENT DOCUMENTS

| | | | | |
|---|---|---|---|---|
| 4,711,554 | A * | 12/1987 | Nishimori | 399/52 |
| 5,045,880 | A * | 9/1991 | Evanitsky et al. | 399/82 |
| 5,287,194 | A * | 2/1994 | Lobiondo | 358/296 |
| 5,752,075 | A * | 5/1998 | Kikinis | 710/1 |
| 5,854,693 | A * | 12/1998 | Yoshiura et al. | 358/468 |
| 5,915,148 | A * | 6/1999 | Hamaguchi et al. | 399/77 |
| 5,933,576 | A * | 8/1999 | Muramatsu | 358/1.1 |
| 6,078,759 | A * | 6/2000 | Satake et al. | 399/8 |
| 6,167,209 | A * | 12/2000 | Suzuki et al. | 399/8 |
| 6,192,202 | B1 * | 2/2001 | Doi | 399/8 |
| 6,363,230 | B1 * | 3/2002 | Masai | 399/82 |
| 6,618,166 | B1 * | 9/2003 | Suzue | 358/1.15 |
| 6,700,678 | B1 * | 3/2004 | Luman | 358/1.15 |
| 6,906,819 | B2 * | 6/2005 | Katsuda et al. | 358/1.15 |
| 6,934,047 | B2 * | 8/2005 | Housel | 358/1.15 |
| 6,963,422 | B2 * | 11/2005 | Unno | 358/1.18 |
| 6,977,735 | B1 * | 12/2005 | Ookuma | 358/1.13 |
| 6,985,245 | B1 * | 1/2006 | Takahashi | 358/1.15 |
| 7,006,249 | B2 * | 2/2006 | Matsuda | 358/1.9 |
| 7,113,297 | B1 * | 9/2006 | Yamaguchi et al. | 358/1.15 |
| 7,130,066 | B1 * | 10/2006 | Kanematu | 358/1.15 |
| 2002/0138558 | A1 * | 9/2002 | Ferlitsch | 709/203 |

FOREIGN PATENT DOCUMENTS

EP 0 782 325 A2 7/1997

OTHER PUBLICATIONS

European Patent Office, "Communication," European Search Report, Mar. 24, 2004, 3 pages.

* cited by examiner

*Primary Examiner*—Thomas D. Lee
*Assistant Examiner*—Satwant Singh
(74) *Attorney, Agent, or Firm*—Hickman Palermo Truong & Becker LLP; Christian A. Nicholes (57) ABSTRACT

A copy machine is configured to determine a set of one or more resources that are both external to the copy machine and available to process one or more portions of a copy job initiated at the copy machine. The copy machine is further configured to display, on a graphical user interface, one or more user interface objects that indicate one or more functions provided by the one or more resources.

17 Claims, 5 Drawing Sheets

COPIER WITH JOB SHARING AND FORWARDING CAPABILITY

FIELD OF THE INVENTION

The invention relates to copy machines, and more specifically, to copy machines that can forward portions of copy jobs to resources that provide functions needed to complete the forwarded portions.

BACKGROUND OF THE INVENTION

For some time now, copy machines have been capable of automatically reproducing images that are displayed on surfaces such as paper. A typical copy machine includes a scanning module and a printing module. The scanning module is capable of generating data based on images that are displayed on a surface. Inversely, the printing module is capable of generating images, based on data, and permanently displaying those images on a surface. A copy machine may also include a raster image processor that receives image data and rasterizes the image data for output to a printing module. By feeding, into a printing module, data that was generated by a scanning module, a copy machine can reproduce an image that is displayed on a surface. The task of reproducing images that are displayed on one or more surfaces may be referred to as a "copy job."

A copy job may involve more than the mere reproduction of images onto surfaces. A copy job may also involve specified manipulations of those images and surfaces. For example, a user of a copy machine may specify that reproduced pages be stapled, punched with holes, and/or bound together with rings or some other binding mechanism.

Some copy machines may provide functions that other copy machines do not provide. A person desiring to make use of functions provided only by certain copy machines is required to locate an available one of those copy machines. Information regarding the availability, functionality, and locations of copy machines can be difficult to obtain. Even when such information can be obtained, it may be outdated and inaccurate.

For example, a person may call numerous shops that are listed in an area telephone book before finding a shop that has a copy machine that can punch and staple papers. The personnel at the called shops may be relatively uninformed as to shop resources. Some of the telephone numbers may not even be correct. Eventually, if the person is lucky, he may locate a shop within reasonable distance that has a copy machine that provides desired functions.

Upon arriving at the shop, the person may discover, to his frustration, that, immediately before his arrival, the needed copy machine broke or became occupied by someone else who planned to use the copy machine for a long period of time. Meanwhile, other copy machines, at the shop or even at the location that the person departed from, sit idle because they cannot provide the desired functions. Moreover, despite their ability to provide one or more of the desired functions of the unavailable copy machine, other available resources, such as some printers, may also remain unused because they lack any mechanism to scan a copy job.

One potential solution to the problem is for the person to obtain for himself a copy machine that provides all of the desired functions. However, such a solution is frequently not economical. Additionally, due to changing technology, even the most sophisticated copy machines eventually become obsolete. Furthermore, such a solution wastes a sufficient scanning module of a copy machine that does not provide all of the desired functions.

Based on the need to more easily access resources that provide desired functions, a copy machine that automatically locates and shares resources that currently provide specified functions is highly desirable.

SUMMARY OF THE INVENTION

A copy machine is configured to determine a set of one or more resources that are both external to the copy machine and available to process one or more portions of a copy job initiated at the copy machine. The copy machine is further configured to display, on a graphical user interface, one or more user interface objects that indicate one or more functions provided by the one or more resources.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

A copy machine is configured to automatically detect other available resources, such as other copy machines and printers. The copy machine is configured to detect functions, such as stapling and punching, that each of these other resources provide. The copy machine is configured to display the functions of these other resources in addition to the functions that the copy machine provides. Objects on a graphical user interface of the copy machine may represent these functions. The copy machine may be configured to detect, through the graphical user interface, a selection of one or more of these objects. The copy machine may be configured to cause the functions indicated by the selected objects to be applied to portions of a copy job initiated at the copy machine, such as by sending portions of a copy job through a network to currently available resources that can provide the functions. Thus, even if the copy machine does not itself provide a desired function, a user of the copy machine may obtain the desired function through the copy machine.

Additionally, according to one embodiment of the invention, the copy machine may be configured to dynamically maintain a current set of detected available resources. Therefore, the copy machine may be configured to display only those functions that a user may currently apply to a copy job. Because the copy machine can automatically and dynamically detect other resources that are currently available, and indicate functions that those other resources provide, a user of the copy machine is freed from the burden of locating an available copy machine that provides desired functions. Also, because the copy machine can send a portion of a copy job even to a resource that lacks a scanning module, the copy machine can combine the use of its own scanning module with a printing module of a printer that includes desired functions not independently provided by the copy machine, thereby preventing a waste of available resources.

Function-Sharing Resources

Figure 1:
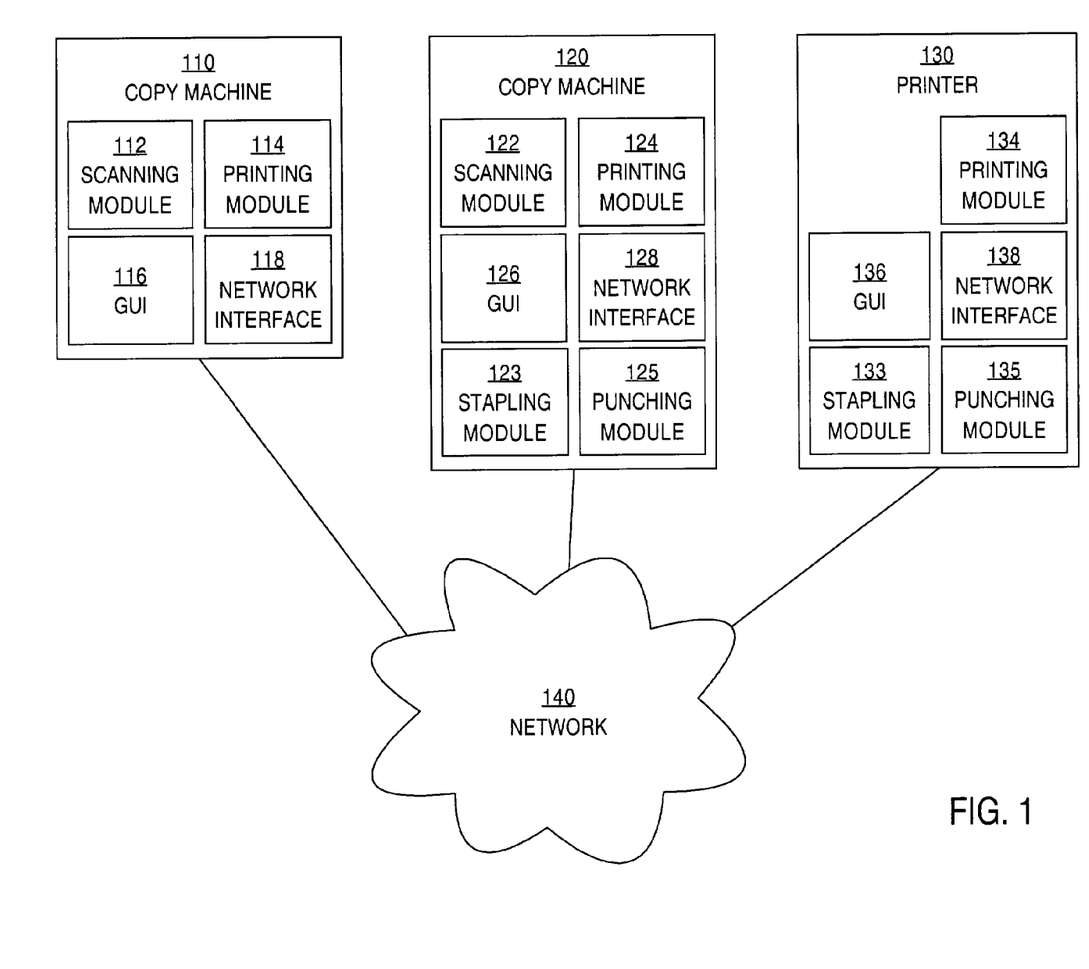
FIG. 1 is a block diagram that illustrates function-sharing resources according to one embodiment of the invention.

FIG. 1 is a block diagram that illustrates function-sharing resources according to one embodiment of the invention. Function-sharing resources include copy machines 110 and 120, and a printer 130.

Copy machine 110 includes a scanning module 112 and a printing module 114. Copy machine 110 also includes a graphical user interface (GUI) 116. GUI 116 may include a Liquid Crystal Display (LCD) with a keyboard and a touch panel. Copy machine 110 may also include a network interface 118, such as a network interface card. Scanning module, printing module 114, GUI 116 and network interface 118 may be communicatively coupled via a system bus. Copy machine 110 may be communicatively coupled to a network 140 through network interface 118. Network 140 may be implemented by any medium or mechanism that provides for the exchange of data between copy machines 110 and 120 and printer 130. Examples of network 140 include, without limitation, a network such as a Local Area Network (LAN), Wide Area Network (WAN), Ethernet or the Internet, or one or more terrestrial, satellite or wireless links. Network 140 may include a combination of networks such as those described. Network 140 may transmit data according to Transmission Control Protocol (TCP) and Internet Protocol (IP).

Copy machine 120 is similar to copy machine 110. Copy machine 120 includes a scanning module 122, a printing module 124, a GUI 126, and a network interface 128. Copy machine 120 may also be communicatively coupled with network 140 through network interface 128. However, copy machine 120 differs from copy machine 110 in that copy machine 120 includes a stapling module 123 and a punching module 125, while copy machine 110 does not include these modules. Therefore, copy machine 120 can, independently of any other resource, provide stapling and punching functions for a copy job. Copy machine 120 can provide these functions due to the inclusion of stapling module 123 and punching module 125 within copy machine 120. In contrast, copy machine 110 cannot, independently of another resource, provide these functions.

Printer 130 is similar to copy machine 120. Printer 130 includes a printing module 134, a GUI 136, a network interface 138, a stapling module 133, and a punching module 135. Printer 130 may also be communicatively coupled with network 140 through network interface 138. However, printer 130 differs from copy machine 120 in that printer 130 lacks a scanning module such as scanning module 112 and scanning module 122. Therefore, while printer 130 can, independently of any other resource, provide stapling and punching functions for a print job, printer 130 cannot independently generate data based on images that are displayed on a surface in the way that scanning modules 112 and 122 can.

Network 140 may include one or more sub-networks. Therefore, copy machine 110 may be communicatively coupled with one sub-network, copy machine 120 may be communicatively coupled with a different sub-network, and both of these sub-networks may be communicatively coupled with another network such as the Internet. Consequently, copy machine 110, copy machine 120, and printer 130 may all be communicatively coupled with each other through network 140. Copy machine 110 may, additionally or alternatively, be directly connected to one or more of copy machine 120 and printer 130 independently of network 140.

According to one embodiment of the invention, copy machine 110 is configured to determine a set of one or more resources that are external to copy machine 110. Copy machine 110 is configured to determine this set such that members of the set include those resources that are available to process a copy job that is initiated at copy machine 110. For example, copy machine 110 is configured to determine if copy machine 120 and printer 130 are available to process a copy job that is initiated at copy machine 110. Copy machine 110 is configured to make this determination automatically, without a human user's intervention.

According to another embodiment of the invention, copy machine 110 is also configured to display one or more user interface objects that indicate one or more functions that are provided by the resources in the determined set. For example, if copy machine 110 determines that copy machine 120 and printer 130 are in the set of resources available to copy machine 110, then copy machine 110 may display, on GUI 116, a user interface object that indicates a stapling function, and also another user interface object that indicates a punching function. Copy machine 110 displays these user interface objects because copy machine 110 determines that copy machine 120 and printer 130 include stapling modules 123 and 133, respectively, and punching modules 125 and 135, respectively. Copy machine 110 may additionally display user interface objects that indicate functions that copy machine 110 can provide independently of other resources, such as copying, enlarging, or darkening.

In one embodiment of the invention, copy machine 110 is also configured to dynamically update the determined set of resources and the user interface objects that are displayed on GUI 116. Copy machine 110 is configured to perform this dynamic updating any time after the point in time in which copy machine 110 initially determined the set of resources. Copy machine 110 may be configured to perform this dynamic updating periodically, or in response to an event such as the receipt of a selection through GUI 116.

For example, if copy machine 110 determines that printer 130 is no longer available to process a copy job, then copy machine 110 may remove from GUI 116 any interface objects that represent functions that are no longer provided by any available resource. For another example, if copy machine 110 then later determines that printer 130 is once again available to process a copy job, then copy machine 110 may add to GUI 116 any interface objects that represent functions that were not formerly provided by any other available resource.

In one embodiment of the invention, copy machine 110 is also configured to detect a user's selection of one or more user interface objects that represent the functions of resources that are currently available to process a copy job. Copy machine 110 is also configured to cause functions that are associated with the selected user interface objects to be applied to at least a portion of the copy job. For example, if a user selects interface objects that represent stapling and punching functions, then copy machine 110 is configured to detect this selection and cause one or more resources, which are configured to staple and punch (e.g., copy machine 120 or printer 130), to process a portion of the copy job upon which stapling and punching is to be performed. To accomplish this, copy machine 110 may scan the copy job and transmit a portion of data, which was generated from the scanning and which represents the portion of the copy job upon which the selected functions are to be performed, through network 140 to either copy machine 120 or printer 130.

In one embodiment of the invention, copy machine 110 is configured to display one or more user interface objects, on GUI 116, that represent available resources that are configured to provide the user-selected functions. For example, if a user selects the stapling function, then copy machine 110 is configured to display currently available resources that include a stapling module (e.g., copy machine 120 and printer 130). In one embodiment of the invention, copy machine 110 is configured to display interface objects for only those resources that are configured to provide all of the user-selected functions.

In one embodiment of the invention, copy machine 110 is configured to display interface objects, which represent resources, in response to detecting a user's selection of an interface object labeled "production," which is displayed separately from an interface object labeled "start." In other words, copy machine 110 may be configured to use only its own internal functions when a "start" object is selected, and may be configured to display additional available resources, which are external to copy machine 110 (e.g., copy machine 120 and printer 130), when a "production" object is selected.

In one embodiment of the invention, copy machine 110 is configured to detect a user's selection of interface objects that represent currently available resources. Copy machine 110 is also configured to cause at least a portion of the copy job to be processed by a resource that is represented by a selected interface object. For example, if a user selects an interface object that represents printer 130, then copy machine 110 is configured to cause at least a portion of a copy job to be processed by printer 130.

For example, copy machine 110 may be configured to scan a copy job using scanning module 112, and then send, through network interface 118 and network 140, all or a portion of the generated image data to printer 130. Printer 130 may be configured to receive the image data, through network 140 and network interface 138, and then print, staple, and punch copies that are based on the received image data.

In one embodiment of the invention, copy machine 110 is configured to display, in association with each user interface object that indicates a currently available resource, an indication of the physical location of the resource. For example, copy machine may be configured to display a user interface object that indicates that printer 130 is located locally at the same named place that copy machine 110 is located. For another example, copy machine 110 may be configured to display a user interface object that indicates that copy machine 120 is remotely located at a different named place (e.g., "ABC copy shop") than the place at which copy machine 110 is located. Thus, a user of copy machine 110 is provided with information as to where the user's copy job will be completed if the user selects a certain interface object that indicates a resource. The user may beneficially use this information to select resources.

In one embodiment of the invention, status information regarding a resource may be indicated in association with each user interface object that represents a resource. For example, status information may indicate the availability or unavailability of a resource. Status information may indicate how long a resource has been in use, and an anticipated amount of time or a number or pages that remain to be processed before the resource will have completed a currently pending copy job. Status information may indicate whether a resource is currently functional or out-of-order.

In one embodiment of the invention, copy machine 110 is configured to indicate, for each interface object that represents a function, one or more resources that are configured to provide the function. A physical location of each resource may also be indicated for each indicated resource. Thus, a user of copy machine 110 is provided with information as to which functions may be obtained at certain locations. The user may beneficially use this information to select functions.

In one embodiment of the invention, copy machine 110 is configured to translate data, which is generated by scanning module 112, into a format that an external resource is configured to understand. For example, copy machine 110 may be configured to translate data from a scanned copy job into a format or protocol that copy machine 120 is configured to interpret.

In one embodiment of the invention, copy machine 110 is configured to send one portion of a copy job to one external resource (e.g., copy machine 120) and another portion of a copy job to another external resource (e.g., printer 130). Additionally, copy machine 110 may be configured to use printing module 114 to process yet another portion of a copy job locally. In other words, copy machine 110 may be configured to distribute a copy job among multiple resources. The portions distributed to each resource may be based on the functions provided by that resource and the functions needed to completely process that portion. For example, one portion, which a user specifies to be punched, may be processed by copy machine 120 at the same time that another portion, which a user does not specify to be punched, may be processed by copy machine 110. By sending portions of a copy job to multiple resources, copy job processing may be completed in a parallel, rather than a serial, manner. Thus, a copy job may be completed more quickly (i.e., with a greater page-per-minute rate) than if the copy job had to be completed using only one resource at a time.

Distributed Server Application

Figure 2:
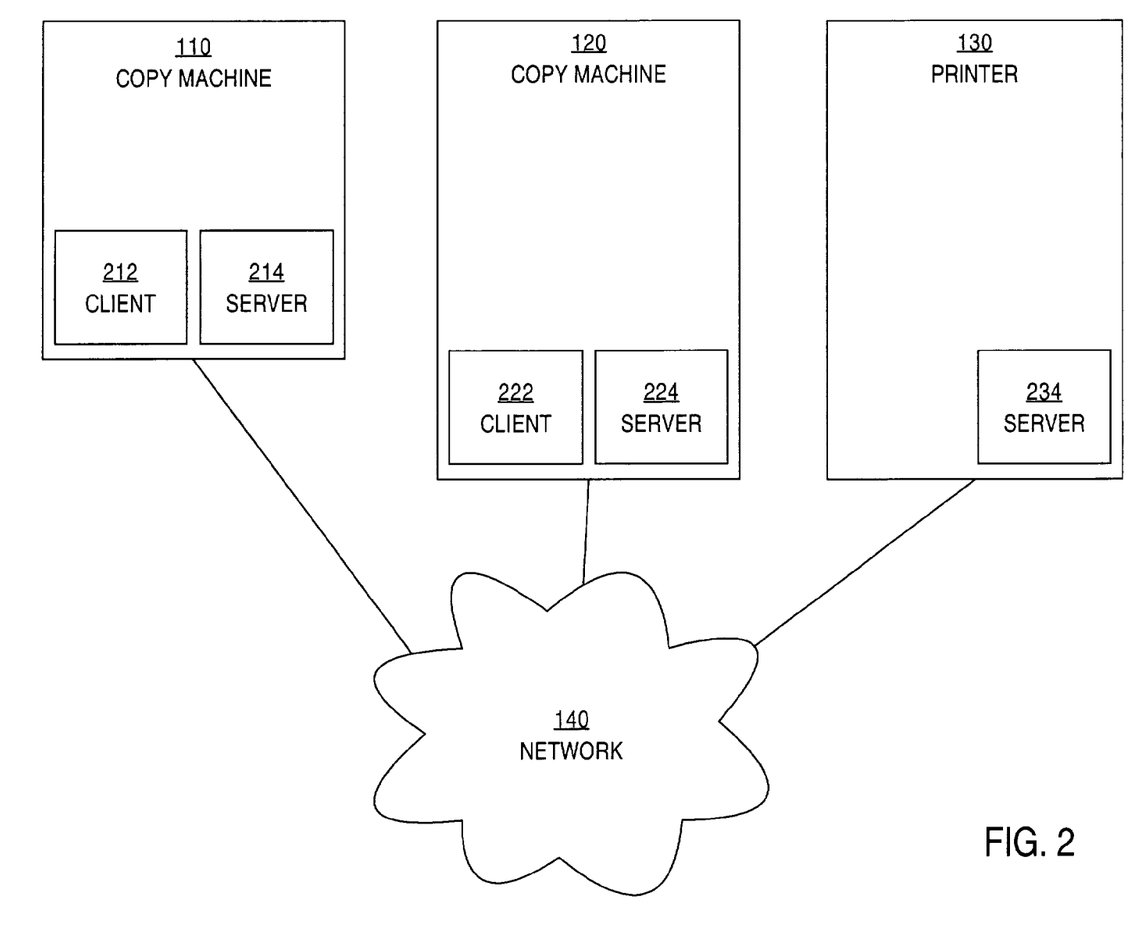
FIG. 2 is a block diagram that illustrates function-sharing resources, some of which include a client and a server, according to one embodiment of the invention.

FIG. 2 is a block diagram that illustrates function-sharing resources, some of which include a client and a server, according to one embodiment of the invention. In the embodiment illustrated, copy machine 110 includes a client 212 and a server 214. Copy machine 120 includes a client 222 and a server 224. Printer 130 includes a server 234.

In one embodiment of the invention, each of clients 212 and 222 are configured to transmit a query through network 140. The query requests a response that indicates functions that are provided by the resource that is the recipient of the request. For example, client 212 may be configured to broadcast or otherwise transmit on network 140 a query that requests responses to client 212. If network 140 includes a LAN, then client 212 may broadcast the query to resources that are communicatively coupled to the LAN. If network 140 does not support broadcasting, then client 212 may transmit the query using whatever means that network 140 supports.

In one embodiment of the invention, each of servers 214, 224, and 234 are configured to receive a query from network 140. Each of servers 214, 224, and 234 are configured to transmit, in reply to a received query, a response that indicates the functions that the server's resource provides. In one embodiment of the invention, the response also includes an identity of the resource that provides the functions. Each of servers 214, 224, and 234 are configured to transmit this response through network 140 to the client identified by the query. For example, in reply to a query received from client 212, server 224 may transmit a response to client 212. The response indicates that copy machine 120 at least provides stapling and punching functions.

In an alternative embodiment of the invention, each of servers 214, 224, and 234 is configured to periodically transmit, even in the absence of a query, a signal that indicates the functions that the server's resource provides. In one embodiment of the invention, the signal also includes an identity of the resource that provides the functions. Each of servers 214, 224, and 234 may be configured to transmit this signal through network 140. For example, server 224 may periodically transmit a signal through network 140. The signal indicates that copy machine 120 at least provides stapling and punching functions. If network 140 includes a LAN, then each of servers 214, 224, and 234 may broadcast signals to resources that are communicatively coupled to the LAN. If network 140 does not support broadcasting, then each of servers 214, 224, and 234 may transmit the signals using whatever means that network 140 supports.

In one embodiment of the invention, each of clients 212 and 222 are also configured to receive signals that may or may not be responses to a query. A signal may indicate functions that are provided by a resource that transmitted the signal. Each of copy machines 110 and 120 are configured to display user interface objects, on GUIs 116 and 126, respectively, that indicate the functions that a received signal indicates.

Centralized Server Application

Figure 3:
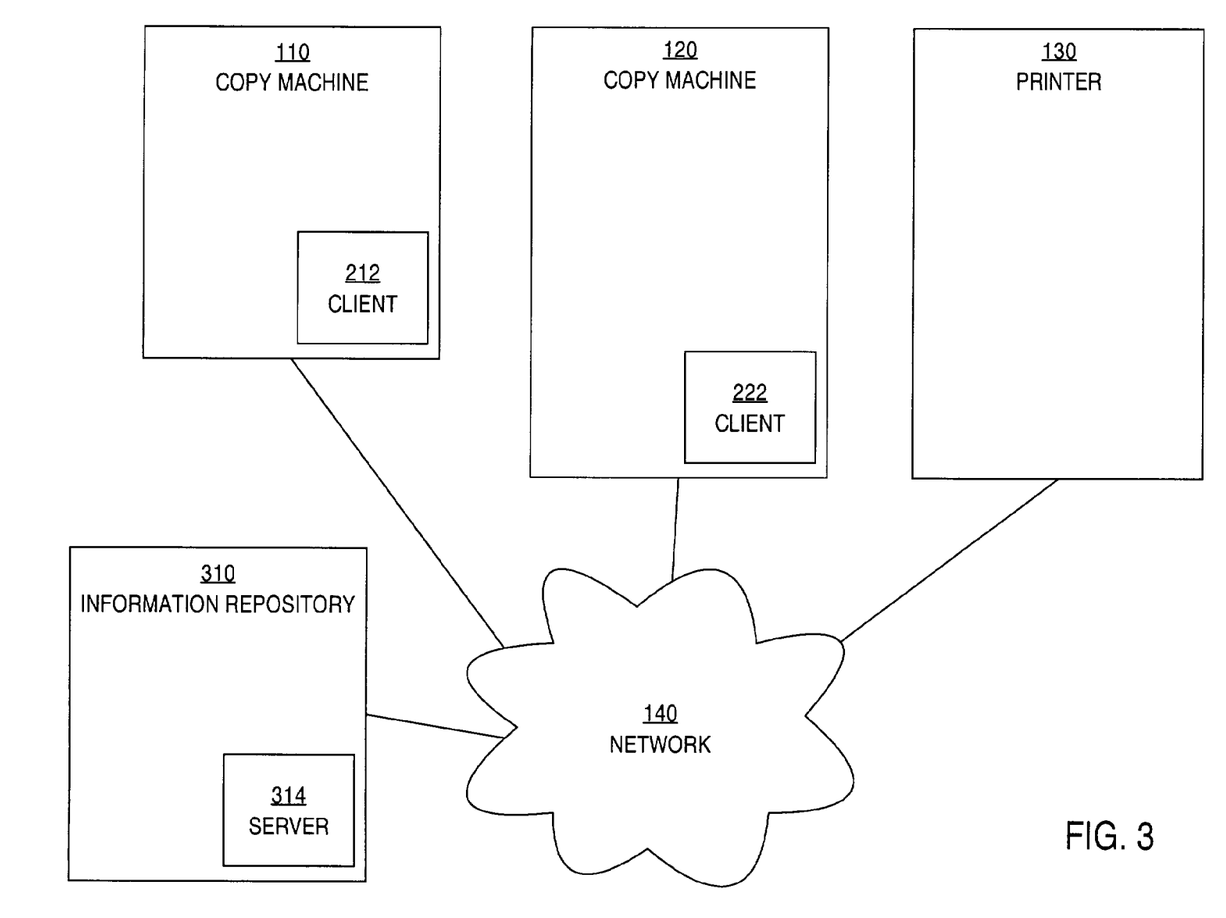
FIG. 3 is a block diagram that illustrates function-sharing resources and an information repository according to one embodiment of the invention.

FIG. 3 is a block diagram that illustrates function-sharing resources and an information repository according to one embodiment of the invention. In the embodiment illustrated, an information repository 310 is communicatively coupled to network 140. Information repository 310 is a storage mechanism such as a computer that includes non-volatile storage, e.g., a hard disk drive. Information repository 310 is configured to store information that indicates the functions provided by each of copy machines 110 and 120, and printer 130. Information repository 310 includes a server 314 that functions similarly to servers 214, 224, and 234. Because information repository 310 includes server 314, copy machines 110 and 120, and printer 130 do not need to include servers.

In one embodiment of the invention, server 314 receives and responds to queries sent through network 140 from clients 212 and 222. The queries request responses that indicate functions that are provided by copy machines 110 and 120, and printer 130. According to an alternative embodiment of the invention, server 314 periodically transmits signals through network 140 without having to be queried by other devices. The signals indicate functions that are provided by each of copy machines 110 and 120, and printer 130.

Example of Usage

Figure 4:
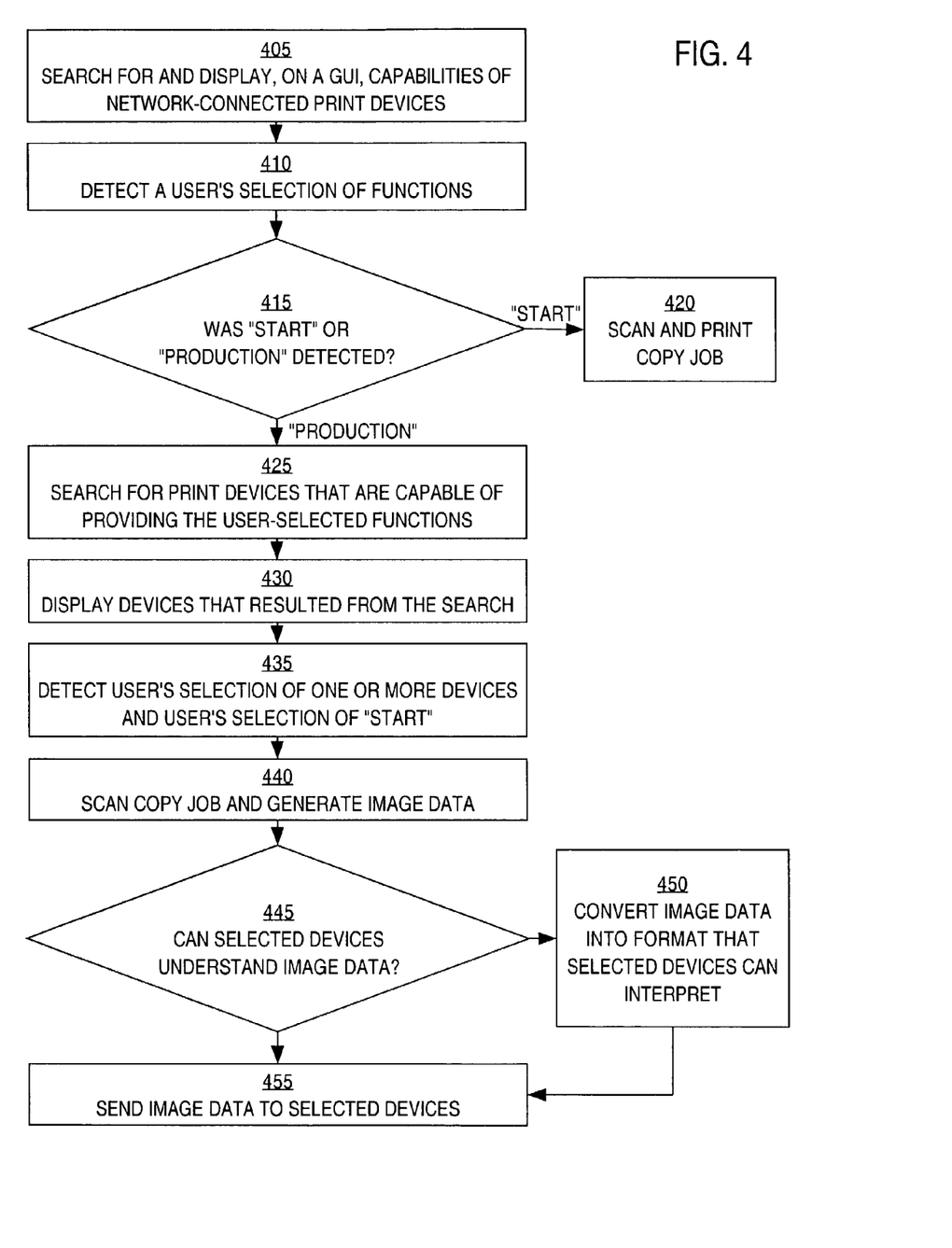
FIG. 4 is a flow diagram that illustrates an example of the usage of a function-sharing copy machine to complete a copy job according to one embodiment of the invention.

FIG. 4 is a flow diagram that illustrates an example of the usage of a function-sharing copy machine to complete a copy job according to one embodiment of the invention. In block 405, a copy machine, such as copy machine 110, searches one or more network-connected print devices (including other copy machines) for the capabilities of those devices. Such capabilities may include the ability to staple, punch, or bind paper. The copy machine shows these capabilities as available functions on the copy machine's operation panel, which may include a GUI. An example of such an operation panel is described below with reference to FIG. 5. The copy machine may also identify particular resources that provide the indicated functions, as well as other information about those resources, such as location and current status.

Referring again to FIG. 4, in block 410, the copy machine detects a user's selection of one or more available functions. The copy machine may also detect the user's selection of a number of copies to be made.

In block 415, the copy machine detects a user's selection of either a "start" object (e.g., button) or a "production" object, such as are described below with reference to FIG. 5. If the copy machine detects the selection of the "start" object, then control passes to block 420. If the copy machine detects the selection of the "production" object, then control passes to block 425.

In block 420, the copy machine scans the papers that comprise the copy job and prints copies based on data that is generated by the scanning.

In block 425, the copy machine searches for available print devices that are capable of processing the copy job with the selected functions. Although many devices may be detected and available, in one embodiment of the invention, only those devices that are configured to provide all of the selected functions are selected in the search. For example, if the stapling function is selected, then, in one embodiment of the invention, only those available devices that include a stapling module are selected in the search. The search may be performed using any of the techniques described above with reference to FIG. 2 and FIG. 3.

In block 430, the copy machine displays the available devices that were selected as a result of the search. In one embodiment of the invention, the copy machine displays, with each device, a location of that device. An example of a user interface that displays the location of available devices is described below with reference to FIG. 6.

Referring again to FIG. 4, in block 435, the copy machine detects a user's selection of one or more devices from among the displayed devices. The copy machine also detects a user's selection of the "start" object.

In block 440, the copy machine scans each paper that comprises the copy job and generates image data.

In block 445, the copy machine determines if the user-selected devices are configured to understand the format of the image data. If the user-selected devices are not configured to understand the format of the image data, then control passes to block 450. If the user-selected devices are configured to understand the format of the image data, then control passes to block 455.

In block 450, the copy machine converts the image data into a format that can be interpreted by the user-selected devices.

In block 455, the copy machine sends the image data to the user-selected devices. The copy machine may send the image data to a device at a remote location such as a copy shop.

Example User Interface

Figure 5:
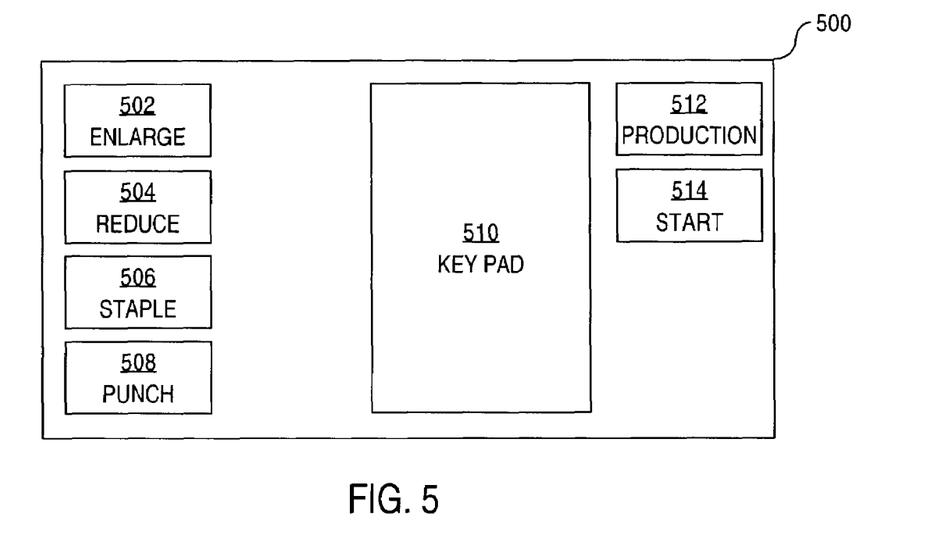
FIG. 5 is a block diagram that illustrates an example of a user interface that is capable of displaying user interface objects that represent functions.

FIG. 5 is a block diagram that illustrates an example of a user interface that is capable of displaying user interface objects that represent functions. The graphical user interface illustrated is one example of a user interface that may be included on a copy machine's operation panel. A user interface 500 includes interface objects 502-508, a key pad 510, a production button 512, and a start button 514. One or more of the components of user interface 500 may be implemented using a touch-sensitive LCD. Thus, one or more components of user interface 500 may be graphically rendered.

Interface objects 502-508 indicate functions that one or more resources are configured to provide relative to a copy job. Interface object 502 indicates the availability of an enlarge function. Interface object 504 indicates the availability of a reduce function. Interface object 506 indicates the availability of a staple function. Interface object 508 indicates the availability of a punch function. A user may select one or more of interface objects 502-508 by touching the interface objects that the user wishes to select. Selection of an interface object may cause that interface object to differ in appearance to indicate that the user interface has detected the selection of that interface object. For example, if interface object 502 has been selected, then interface object 502 may be shown in a darker color.

Depending on the resources currently available and the functions that those resources provide, the number and content of the interface objects may differ. One or more functions represented by the user interface objects may be functions that are provided by the copy machine from which the copy job is to be initiated (i.e., scanned). One or more functions represented by the user interface objects may be functions that are not provided by the copy machine from which the copy job is to be initiated, but are provided by one or more resources that are external to that copy machine.

Key pad 510 may include actual physical keys or a graphical representation of keys. Key pad 510 may include numerical keys for digits 0-9. Key pad 510 may also include keys that represent other symbols, such as "*" and "#". A user may use the keys of key pad 510 to input information that is requested by the copy machine, such as a number of copies to be made.

In one embodiment of the invention, if production button 512 is selected, then user interface 500 displays one or more other interface objects that represent resources that are configured to provide the functions that are represented by user-selected ones of interface objects 502-508. For example, user interface 500 may display other interface objects such as those illustrated by FIG. 6. Production button 512 may be displayed in a darker color when production button 512 is selected.

In one embodiment of the invention, if start button 514 is selected, then the copy job is processed according to whatever functions have been selected. If no functions have been selected, or if the only functions that have been selected are functions that the copy machine itself provides, then the copy machine may process the copy job itself without the assistance of any external resource.

Figure 6:
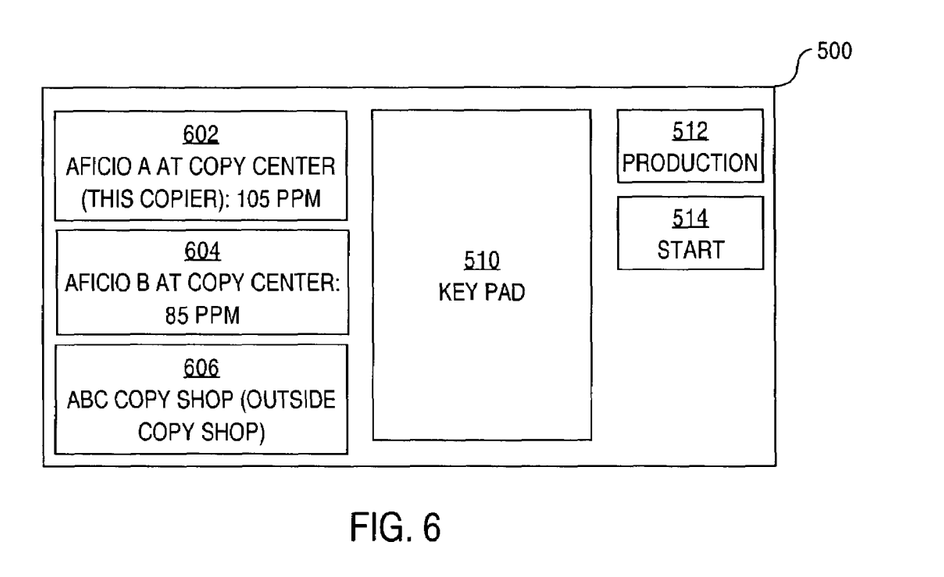
FIG. 6 is a block diagram that illustrates an example of a user interface that is capable of displaying user interface objects that represent resources.

FIG. 6 is a block diagram that illustrates an example of a user interface that is capable of displaying user interface objects that represent resources. In one embodiment of the invention, when production button 512 is selected, then user interface 500 displays interface objects 602-606. Interface objects 602-606 may be displayed instead of, or in addition to, interface objects 502-508. Depending on the resources currently available, the number and content of the interface objects may differ.

Interface objects 602-606 indicate one or more resources that provide user-selected functions. Interface objects 602-606 may indicate one or more resources that provide the functions that are represented by selected ones of interface objects 502-508. One or more of interface objects 602-606 may also indicate a location of a resource. Interface objects 602-606 may also indicate a rate (e.g., in pages per minute (PPM)) at which a resource is capable of processing a copy job.

For example, interface object 602 indicates a copy machine "Aficio A" that is located at the local copy center. Interface object 602 also indicates that "Aficio A" is capable of processing a copy job at 105 pages per minute. Interface object 602 also indicates that "Aficio A" is the copy machine that includes user interface 500 (i.e., "this copier"). Interface object 604 indicates that another copy machine "Aficio B" is also located at the local copy center. Interface object 604 indicates that "Aficio B" is capable of processing a copy job at 85 pages per minute. Interface object 606 indicates the availability of a resource at a location called "ABC Copy Shop". Interface object 606 also indicates that this resource is at a remote location (i.e., "outside copy shop").

A user may select one or more of interface objects 602-606 by touching the interface objects that the user wishes to select. Selection of an interface object may cause that interface object to differ in appearance to indicate that the user interface has detected the selection of that interface object.

In one embodiment of the invention, if start button 514 is selected, then one or more portions of the copy job are processed by the user-selected resources.

Implementation Mechanisms

Various embodiments of the invention, such as those described above, may be implemented in a variety of ways and contexts and the invention is not limited to any particular implementation or context. For example, embodiments of the invention may be implemented in the firmware of a copy machine. Firmware includes programs or data that have been written onto read-only memory (ROM). Firmware may include a combination of software and hardware. For example, ROMs, PROMs, and EPROMs, onto which data or programs are recorded, are firmware. Embodiments of the invention may be implemented in hardware alone. Embodiments of the invention may be implemented in software alone. Embodiments of the invention may be implemented in a combination of hardware and software. Embodiments of the invention are not limited according to implementation.

While some embodiments of the invention may be implemented within a copy machine such as copy machine 110, other embodiments of the invention may be implemented externally to a copy machine. For example, in one embodiment of the invention, copy machine 110 may be communicatively coupled (e.g., via a firewire, Ethernet, serial, or USB interface) with an external entity that implements one or more of the functions described herein. One such external entity is a computer that includes a general-purpose processor and memory that stores instructions to perform one or more of the functions described herein. Another such external entity is a device that includes an Application-Specific Integrated Circuit (ASIC) that is designed to perform one or more of the functions described herein. Other external entities, not specifically enumerated herein, may also implement one or more of the functions described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A first copy machine configured to:
    determine a set of one or more resources that are both external to the first copy machine and available to process one or more portions of a copy job initiated at the first copy machine;
    display, on a graphical user interface of the first copy machine, one or more user interface objects that indicate one or more functions provided by the one or more resources, wherein the one or more user interface objects include at least a first user interface object that is associated with a particular function that (a) the first copy machine is not configured to provide and (b) at least one of the one or more resources is configured to provide;
    detect user selection of the first user interface object from the one or more user interface objects;
    send a first portion of a copy job, which first portion requires the particular function, to be printed by a first resource that is (1) associated with the first user interface object, (2) capable of providing the particular function, and (3) capable of printing the first portion of the copy job; and
    print, locally, a second portion of the copy job, which second portion does not require the particular function;
    wherein the first resource is one of: (i) a second copy machine per se, and (ii) a printer per se.

2. The first copy machine as recited in claim 1, wherein the first copy machine itself does not provide at least one of the one or more of the functions.

3. The first copy machine as recited in claim 1, wherein the first copy machine is further configured to transmit a query that requests a response that indicates one or more of the functions.

4. The first copy machine as recited in claim 3, wherein the first copy machine is further configured to transmit the query to the one or more resources.

5. The first copy machine as recited in claim 3, wherein the first copy machine is further configured to transmit the query to a repository that stores information that indicates the one or more functions.

6. The first copy machine as recited in claim 1, wherein the first copy machine is further configured to receive one or more signals that indicate the one or more functions and the set of one or more resources.

7. The first copy machine as recited in claim 1, wherein the one or more resources are communicatively coupled to the first copy machine via a network.

8. The first copy machine as recited in claim 7, wherein the one or more resources include one or more other copy machines.

9. The first copy machine as recited in claim 7, wherein the one or more resources include one or more printers.

10. The first copy machine as recited in claim 1, wherein:
    the determination of the set of one or more resources is performed at a first point in time; and
    the first copy machine is further configured to dynamically update, at a second point in time after the first point in time, both the set of one or more resources and the one or more user interface objects to reflect changes in available resources.

11. The first copy machine as recited in claim 1, wherein the copy machine is further configured to display, on the graphical user interface, one or more other user interface objects that indicate the set of one or more resources.

12. The first copy machine as recited in claim 11, wherein the first copy machine is further configured to:
    detect user selection of a particular user interface object from the one or more other user interface objects; and
    cause at least a portion of the copy job to be processed by a particular resource, from the set of one or more resources, that is associated with the particular user interface object.

13. The first copy machine as recited in claim 12, wherein the first copy machine is further configured to:
    generate image data by scanning at least a portion of the copy job; and
    convert at least a portion of the image data into a format that can be interpreted by the particular resource.

14. The first copy machine as recited in claim 11, wherein:
    the first copy machine is further configured to detect user selection of one or more particular user interface objects from the one or more user interface objects that indicate the one or more functions; and
    the one or more other user interface objects indicate those of the one or more resources that provide one or more of the functions.

15. The first copy machine as recited in claim 11, wherein the one or more other user interface objects indicate one or more locations of the set of one or more resources.

16. The first copy machine as recited in claim 1, wherein the first copy machine is configured to split the copy job into at least the first portion and the second portion and to print at least part of the second portion concurrently with the first resource printing at least part of the first portion.

17. A first copy machine configured to:
    receive, via a network, one or more signals that indicate one or more functions that are provided by one or more resources that are external to the first copy machine, wherein the one or more resources are available to process one or more portions of a copy job initiated at the first copy machine, and wherein at least one of the one or more functions is not provided by the first copy machine itself;
    determine, based on the one or more signals, at a first point in time, a set of the one or more resources;
    display, on a graphical user interface of the first copy machine, one or more user interface objects that indicate the one or more functions, wherein the one or more user interface objects include at least a first user interface object that is associated with a particular function that (a) the first copy machine is not configured to provide and (b) at least one of the one or more resources is configured to provide;

dynamically update, to reflect changes in available resources at a second point in time after the first point in time, both the set of one or more resources and the one or more user interface objects;

detect user selection of the first user interface object from the one or more user interface objects;

display, on the graphical user interface, one or more other user interface objects that indicate at least one of the one or more resources that provides one or more functions associated with the first user interface object, wherein the one or more other user interface objects indicate one or more locations of the at least one of the one or more resources;

detect user selection of a second user interface object from the one or more other user interface objects;

generate image data by scanning at least a portion of the copy job;

convert at least a portion of the image data into a format that can be interpreted by a resource associated with the second user interface object;

split the copy job into at least a first portion and a second portion;

send the first portion of the copy job, which first portion requires the particular function, to a first resource for printing; and print, locally, the second portion of the copy job, which second portion does not require the particular function;

wherein the first copy machine is configured to print at least part of the second portion concurrently with the first resource printing at least part of the first portion; and wherein the first resource is one of: (i) a second copy machine per se and (ii) a printer per se.

* * * * *

UNITED STATES PATENT AND TRADEMARK OFFICE
CERTIFICATE OF CORRECTION

PATENT NO. : 7,375,836 B1
APPLICATION NO. : 10/280207
DATED : May 20, 2008
INVENTOR(S) : Tomotoshi Sato It is certified that error appears in the above-identified patent and that said Letters Patent is hereby corrected as shown below:

On the title page, item:

(73) Assignee:

Delete "Ricoh Comapny, Ltd." and replace with --Ricoh Company, Ltd.--.

Signed and Sealed this

Third Day of November, 2009

David J. Kappos
*Director of the United States Patent and Trademark Office*